US012633152B2

(12) United States Patent
Liu et al.

(10) Patent No.: US 12,633,152 B2
(45) Date of Patent: May 19, 2026

(54) METHOD, ELECTRONIC DEVICE AND COMPUTER PROGRAM PRODUCT FOR DATA PROCESSING

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 806 days.

(21) Appl. No.: 17/989,831

(22) Filed: Nov. 18, 2022

(65) Prior Publication Data

US 2024/0185629 A1     Jun. 6, 2024

(30) Foreign Application Priority Data

Oct. 21, 2022     (CN) .......................... 202211311636.9

(51) Int. Cl.
*G06V 30/413*          (2022.01)
*G06V 10/28*          (2022.01)
*G06V 10/70*          (2022.01)

(52) U.S. Cl.
CPC ............ *G06V 30/413* (2022.01); *G06V 10/28* (2022.01); *G06V 10/70* (2022.01)

(58) Field of Classification Search
CPC ...... G06V 30/413; G06V 10/28; G06V 10/70; G06V 10/778; G06V 10/40; G06V 10/772;

(Continued)

(56) References Cited

U.S. PATENT DOCUMENTS

2019/0294874 A1\*  9/2019  Orlov ...................... G06F 40/20
2021/0383584 A1\*  12/2021  Zhang ...................... G06T 3/40
(Continued)

OTHER PUBLICATIONS

I. J. Goodfellow et al., "Generative Adversarial Nets," Advances in Neural Information Processing Systems, arXiv:1406.2661v1, Jun. 10, 2014, 9 pages.

(Continued)

*Primary Examiner* — Oneal R Mistry
*Assistant Examiner* — Jongbong Nah
(74) *Attorney, Agent, or Firm* — Ryan, Mason & Lewis, LLP

(57) ABSTRACT

Embodiments of the present disclosure provide a method, an electronic device, and a computer program product for data processing. A method for data processing includes acquiring an image input and text input pair, the image input and text input pair comprising image input and text input, obtaining an image feature codebook corresponding to the image input and a text feature codebook corresponding to the text input, and training a text-image association model by using the image feature codebook and the text feature codebook, the text-image association model implementing the data processing based on the association between the image input and the text input. For example, a model may be adopted to learn an association between an image feature codebook corresponding to image input and a text feature codebook corresponding to text input, and data processing, such as data compression or data retrieval, is implemented using the learned association.

20 Claims, 8 Drawing Sheets

(58) Field of Classification Search
CPC ..... G06V 10/82; G06F 40/205; G06F 40/242;
G06N 3/08; G06N 20/00
See application file for complete search history.

(56)                    References Cited

U.S. PATENT DOCUMENTS

| | | | | |
|---|---|---|---|---|
| 2022/0172080 | A1* | 6/2022 | Chaudhury | .......... G06N 3/0895 |
| 2022/0391587 | A1* | 12/2022 | Feng | ....................... G06V 10/40 |
| 2024/0112088 | A1* | 4/2024 | Yu | .......................... G06N 3/084 |

OTHER PUBLICATIONS

C. Ledig et al., "Photo-Realistic Single Image Super-Resolution Using a Generative Adversarial Network," IEEE Conference on Computer Vision and Pattern Recognition (CVPR), arXiv:1609.04802v5, May 25, 2017, 19 pages.
X. Wang et al., "ESRGAN: Enhanced Super-Resolution Generative Adversarial Networks," IEEE Conference on Computer Vision and Pattern Recognition, Sep. 2018, 16 pages.
A. Jolicoeur-Martineau, "The Relativistic Discriminator: A Key Element Missing from Standard GAN," International Conference on Learning Representations, Jul. 2, 2018, 26 pages.
N. C. Rakotonirina et al., "ESRGAN+: Further Improving Enhanced Super-Resolution Generative Adversarial Network," IEEE International Conference on Acoustics, Speech and Signal Processing, arXiv:2001.08073v2, Jul. 15, 2020, 5 pages.
J. Devlin et al., "BERT: Pre-training of Deep Bidirectional Transformers for Language Understanding," arXiv:1810.04805v2, May 24, 2019, 16 pages.
Z.-S. Liu et al., "Reference Based Face Super-Resolution," IEEE Access, vol. 7, Sep. 23, 2019, pp. 129112-129126.
J. Engel et al., "Latent Constraints: Learning to Generate Conditionally from Unconditional Generative Models," arXiv:1711.05772v2, Dec. 21, 2017, 22 pages.
Z.-S. Liu et al., "Unsupervised Real Image Super-Resolution via Generative Variational AutoEncoder," IEEE International Conference on Computer Vision and Pattern Recognition Workshop, arXiv:2004.12811v1, Apr. 27, 2020, 10 pages.
A. Lugmayr et al., "SRFlow: Learning the Super-Resolution Space with Normalizing Flow," European Conference on Computer Vision, arXiv:2006.14200v2, Jul. 31, 2020, 32 pages.
Y. Bahat et al., "Explorable Super Resolution," IEEE/CVF Conference on Computer Vision and Pattern Recognition, Jun. 2020, pp. 2716-2725.
M. C. Bühler et al., "DeepSEE: Deep Disentangled Semantic Explorative Extreme Super-Resolution," Asian Conference on Computer Vision, arXiv:2004.04433v3, Oct. 2, 2020, 19 pages.
A. Radford et al., "Learning Transferable Visual Models From Natural Language Supervision," International Conference on Machine Learning, arXiv:2103.00020v1, Feb. 26, 2021, 48 pages.

A. Van Den Oord et al., "Neural Discrete Representation Learning," Conference on Neural Information Processing Systems, Dec. 2017, 10 pages.
A. Razavi et al., "Generating Diverse High-Fidelity Images with VQ-VAE-2," Conference on Neural Information Processing Systems, Dec. 2019, 11 pages.
A. Kuhnle et al, "ShapeWorld: A New Test Methodology for Multimodal Language Understanding," arXiv:1704.04517v1, Apr. 14, 2017, 10 pages.
N. Audebert et al., "Multimodal Deep Networks for Text and Image-Based Document Classification," Joint European Conference on Machine Learning and Knowledge Discovery in Databases, arXiv:1907.06370v1, Jul. 15, 2019, 8 pages.
F. Bianchi et al., "Contrastive Language-Image Pre-training for the Italian Language," arXiv:2108.08688v1, Aug. 19, 2021, 7 pages.
A. Ramesh et al., "Zero-Shot Text-to-Image Generation," International Conference on Machine Learning, arXiv:2102.12092v2, Feb. 26, 2021, 20 pages.
A. Ramesh et al., "Hierarchical Text-Conditional Image Generation with CLIP Latents," arXiv:2204.06125v1, Apr. 13, 2022, 27 pages.
A. Nichol et al., "GLIDE: Towards Photorealistic Image Generation and Editing with Text-Guided Diffusion Models," arXiv:2112.10741v3, Mar. 8, 2022, 20 pages.
R. Gal et al., "StyleGAN-NADA: CLIP-Guided Domain Adaptation of Image Generators," arXiv:2108.00946v2, Dec. 16, 2021, 25 pages.
K. Frans et al., "CLIPDraw: Exploring Text-to-Drawing Synthesis through Language-Image Encoder," arXiv:2106.14843v1, Jun. 28, 2021, 9 pages.
P. Schaldenbrand et al., "StyleCLIPDraw: Coupling Content and Style in Text-to-Drawing Synthesis," arXiv:2111.03133v2, Mar. 1, 2022, 3 pages.
O. Patashnik et al., "StyleCLIP: Text-Driven Manipulation of StyleGAN Imagery," arXiv:2103.17249v1, Mar. 31, 2021, 18 pages.
S. Schwettmann et al., "Toward a Visual Concept Vocabulary for GAN Latent Space," arXiv:2110.04292v1, Oct. 8, 2021, 15 pages.
H. Luo et al., "UniVL: A Unified Video and Language Pre-Training Model for Multimodal Understanding and Generation," arXiv:2002.06353v3, Sep. 15, 2020, 15 pages.
H. Fang et al., "CLIP2Video: Mastering Video-Text Retrieval via Image CLIP," arXiv:2106.11097v1, Jun. 21, 2021, 10 pages.
H. Luo et al., "CLIP4Clip: An Empirical Study of CLIP for End to End Video Clip Retrieval," arXiv:2104.08860v2, May 8, 2021, 14 pages.
T.-J. Fu et al., "Language-Driven Artistic Style Transfer," arXiv:2106.00178v3, Jul. 17, 2022, 20 pages.
G. Kwon et al., "CLIPstyler: Image Style Transfer with a Single Text Condition," arXiv:2112.00374v3, Mar. 19, 2022, 22 pages.
P. Schaldenbrand et al., "StyleCLIPDraw: Coupling Content and Style in Text-to-Drawing Translation," arXiv:2202.12362v1, Feb. 24, 2022, 8 pages.
Z. Liu et al., "Photo-Realistic Image Super-Resolution via Variational Autoencoders," IEEE Transactions on Circuits and Systems for Video Technology, vol. 31, No. 4, Apr. 2021, 15 pages.

* cited by examiner

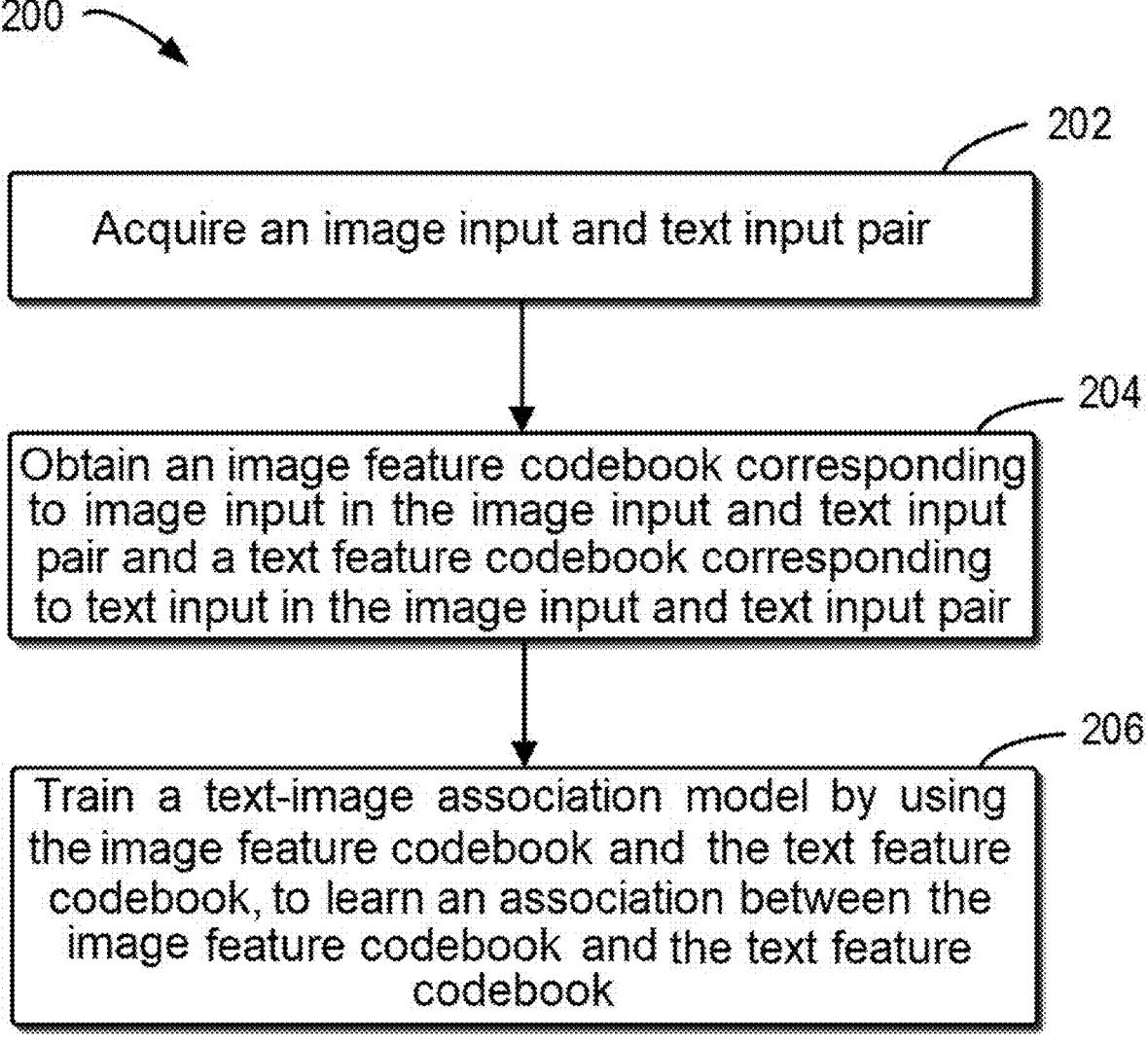

200

202

Acquire an image input and text input pair

204

Obtain an image feature codebook corresponding to image input in the image input and text input pair and a text feature codebook corresponding to text input in the image input and text input pair

206

Train a text-image association model by using the image feature codebook and the text feature codebook, to learn an association between the image feature codebook and the text feature codebook

FIG. 2

METHOD, ELECTRONIC DEVICE AND COMPUTER PROGRAM PRODUCT FOR DATA PROCESSING

RELATED APPLICATION

The present application claims priority to Chinese Patent Application No. 202211311636.9, filed Oct. 21, 2022, and entitled "Method, Electronic Device and Computer Program Product for Data Processing," which is incorporated by reference herein in its entirety.

FIELD

Embodiments of the present disclosure relate to the field of computer technologies, and more particularly, to a method, an electronic device, and a computer program product for data processing.

BACKGROUND

Deep learning is one research direction in the field of machine learning and is used for learning inherent laws and representation levels of sample data, so that machines can analyze and learn like humans and can recognize data such as text, images, and sounds. Deep learning has a wide range of applications in computer vision, natural language processing, reinforcement learning, and other fields.

Mankind is now in the era of big data. With the advent of virtual reality, virtual worlds, and ultra-high definition 2D/3D video and images, it is important to store and organize data effectively to ensure instant retrieval and display. The success of deep learning points out directions for data mining and pattern recognition. With enough computing power, deep learning can digest vast amounts of data to find latent correlations in many applications. How to achieve more efficient data processing by using deep learning is still an urgent problem to be solved currently.

SUMMARY

Embodiments of the present disclosure provide a solution for data processing.

In a first aspect of the present disclosure, a method for data processing is provided. The method includes: acquiring an image input and text input pair, the image input and text input pair including image input and text input; obtaining an image feature codebook corresponding to the image input and a text feature codebook corresponding to the text input; and training a text-image association model by using the image feature codebook and the text feature codebook, the text-image association model implementing the data processing based on the association between the image input and the text input.

In a second aspect of the present disclosure, an electronic device is provided. The electronic device includes at least one processor; and at least one memory storing computer-executable instructions, the at least one memory and the computer-executable instructions being configured to cause, together with the at least one processor, the electronic device to perform operations. The operations include: acquiring an image input and text input pair, the image input and text input pair including image input and text input; obtaining an image feature codebook corresponding to the image input and a text feature codebook corresponding to the text input; and training a text-image association model by using the image feature codebook and the text feature codebook, the text-image association model implementing data processing based on the association between the image input and the text input.

In a third aspect of the present disclosure, a computer program product is provided. The computer program product is tangibly stored on a non-transitory computer-readable medium and includes computer-executable instructions, where the computer-executable instructions, when executed by an electronic device, cause the electronic device to perform the following operations: acquiring an image input and text input pair, the image input and text input pair including image input and text input; obtaining an image feature codebook corresponding to the image input and a text feature codebook corresponding to the text input; and training a text-image association model by using the image feature codebook and the text feature codebook, the text-image association model implementing data processing based on the association between the image input and the text input.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By the following Detailed Description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

FIG. 2 is a flow chart of a method for data processing according to some embodiments of the present disclosure.

DETAILED DESCRIPTION

Figure 1:
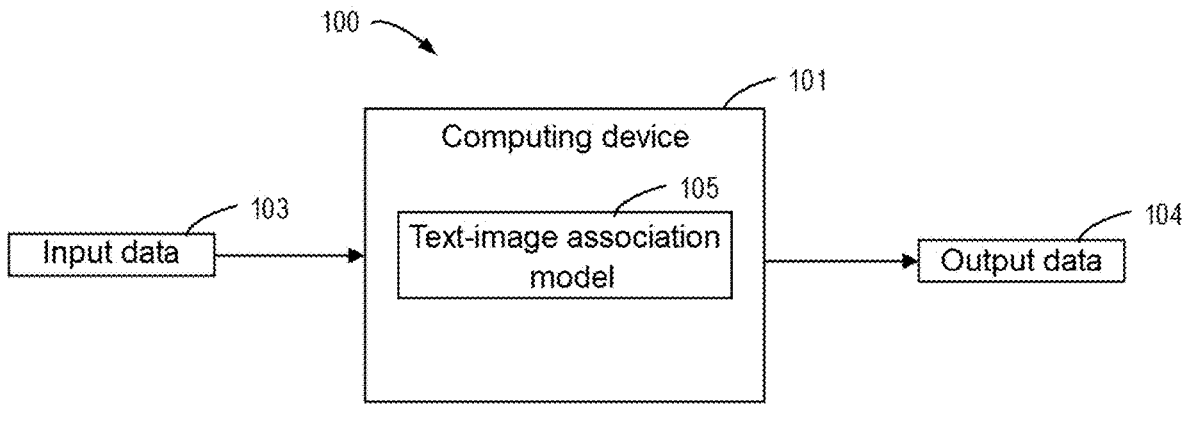
FIG. 1 is a schematic diagram of an example environment in which embodiments of the present disclosure can be implemented.

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As used herein, the term "machine learning" refers to processing involving high-performance computing, machine learning, and artificial intelligence algorithms. Herein, the term "machine learning model" may also be referred to as "learning model," "learning network," "network model," or "model." A "neural network" or "neural network model" may be a deep learning model. In general, a machine learning model is capable of receiving input data, performing predictions based on the input data, and outputting prediction results.

Generally, a machine learning model may include multiple processing layers, each processing layer having multiple processing units. The processing units are sometimes also referred to as convolution kernels. In a convolution layer of a convolution neural network (CNN), processing units are referred to as convolution kernels or convolution filters. Processing units in each processing layer perform corresponding changes on inputs of the processing layer based on corresponding parameters. An output of the processing layer is provided as an input to the next processing layer. An input to the first processing layer of the machine learning model is a model input to the machine learning model, and an output of the last processing layer is a model output of the machine learning model. Inputs to the intermediate processing layers are sometimes also referred to as features extracted by the machine learning model. The values of all parameters of the processing units of the machine learning model form a set of parameter values of the machine learning model.

Machine learning may mainly be divided into three stages, namely, a training stage, a testing stage, and an application stage (also referred to as an inference stage). During the training stage, a given machine learning model can be trained using a large number of training samples and iterated continuously until the machine learning model can obtain, from the training samples, consistent inferences which are similar to the inferences that human intelligence can make. Through training, the machine learning model may be considered as being capable of learning mapping or an association relationship between inputs and outputs from training data. After training, a set of parameter values of the machine learning model is determined. In the testing stage, the trained machine learning model may be tested by using test samples to determine the performance of the machine learning model. In the application stage, the machine learning model may be used for processing, based on the set of parameter values obtained from the training, actual input data to provide corresponding outputs.

With the development of big data, data organization and management become very important. For example, good data retrieval means providing users with a better information acquisition experience. As another example, good data compression can bring greater advantages for data storage and data computing. In order to provide an efficient data processing technology, it is important to have high robustness and efficient data representation in a low-dimensional space. Specifically, dimensionality reduction is realized using the power of deep learning technology. Then, redundant and duplicated data can be compressed, and only key features are retained for recovery and retrieval.

However, existing data processing technologies still have problems in the above aspects. For example, information queried by a user through keyword retrieval is often not sufficiently accurate and cannot meet the requirements of the user. In order to solve at least the above problems, an improved solution for data processing is provided in example embodiments of the present disclosure. In the solution, a bidirectionally trained model is adopted to realize data processing, such as image-to-text dimensionality reduction and compression, or retrieval of an image through text, by using an association between an image feature codebook corresponding to image input and a text feature codebook corresponding to text input.

Through the solution, a bidirectional path of image compression and retrieval referenced by text is adopted to better mine an association between an image and text, so as to achieve more accurate data matching.

FIG. 1 is a schematic diagram of example environment 100 in which embodiments of the present disclosure can be implemented. Example environment 100 includes computing device 101.

Computing device 101 may acquire input data 103, such as an image data set and a text data set for training. Images in the image data set are associated with text in the text data set. In other words, the images in the image data set may be compressed into the text in the text data set, and the images in the image data set may be retrieved through the text in the text data set. Next, computing device 101 may use the acquired image data set and text data set to train text-image association model 105 to learn associations between the images and the text (such as an association between an image feature and a text feature, and an association between an image feature codebook and a text feature codebook).

Computing device 101 may further acquire an application-specific image as part of input data 103 and use trained text-image association model 105 to compress the application-specific image of input data 103 input into text as output data 104 for storage. Computing device 101 may further acquire application-specific text as part of input data 103 and use trained text-image association model 105 to retrieve an image as output data 104 associated with the text of input data 103 from stored image data.

Examples of computing device 101 include, but are not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any one or more of the above systems or devices, and the like. The server may be a cloud server, also referred to as a cloud computing server or a cloud host, and is a host product in a cloud computing service system, to solve the existing problems of high management difficulty and weak business scalability in conventional physical hosts and Virtual Private Server (VPS for short) services. The server may also be a server of a distributed system, or a server combined with a block chain.

Example embodiments for data processing in the present disclosure will be discussed in more detail below with reference to the accompanying drawings.

First referring to FIG. 2, a flow chart of method 200 for data processing according to some embodiments of the present disclosure is shown. Method 200 may be performed by computing device 101 in FIG. 1 or any suitable computing device.

At block 202, an image input and text input pair is acquired. For ease of understanding, the image input and text input pair herein will be described in the following with reference to the image data set and the text data set in FIG. 1. For example, computing device 101 may acquire the image input and text input pair from input data 103 (for example, an image data set and a text data set for training). Image input in the image input and text input pair may be any image in the image data set, text input in the image input and text input pair may be any text in the text data set, and the "any image" is associated with the "any text." In other words, any image in the image data set and text in the text data set associated with the image constitute the image input and text input pair.

At block 204, an image feature codebook corresponding to the image input in the image input and text input pair and a text feature codebook corresponding to the text input in the image input and text input pair are obtained. The image feature codebook and the text feature codebook herein may be obtained by computing device 101 by training a quantization model. For example, the image feature codebook may be obtained by training an image quantization model, and the text feature codebook may be obtained by training a text quantization model.

In some embodiments, training of the image quantization model may be achieved in the following manner. Firstly, computing device 101 performs feature extraction on the image input to obtain an image feature vector corresponding to the image input. Then, computing device 101 quantifies the image feature vector by using an image feature quantization dictionary, to obtain the image feature codebook. Next, computing device 101 reconstructs image output corresponding to the image input by using the image feature codebook. Next, computing device 101 trains the image quantization model based on the image input and the image output. It should be understood that the image feature quantization dictionary may also be obtained by training the image quantization model as described above.

In some embodiments, training of the text quantization model may be achieved in the following manner. Firstly, computing device 101 performs feature extraction on the text input to obtain a text feature vector corresponding to the text input. Then, computing device 101 quantifies the text feature vector by using a text feature quantization dictionary, to obtain the text feature codebook. Next, computing device 101 reconstructs text output corresponding to the text input by using the text feature codebook. Next, computing device 101 trains the text quantization model based on the text input and the text output. It should be understood that the text feature quantization dictionary may also be obtained by training the text quantization model as described above.

At block 206, a text-image association model is trained by using the image feature codebook and the text feature codebook. The text-image association model herein implements the data processing, for example, data retrieval and/or data compression, based on the association between the image input and the text input. In some embodiments, the association between the image input and the text input may be further learned in the following manner. For example, computing device 101 obtains an image feature vector corresponding to the image input and a text feature vector corresponding to the text input, and trains text-image association model 105 by using the image feature vector and the text feature vector, to learn an enhanced association. In some embodiments, text-image association model 105 is trained by using the image feature codebook and the text feature codebook as well as the image feature vector and the text feature vector at the same time, and the learned association can be further enhanced.

With the above method, an enhanced cross-modal association is learned using the image feature codebook and the text feature codebook, and mapping between text and the image is better, so as to achieve more accurate and fast data matching.

In some embodiments, method 200 may further include the following steps to use the above trained text-image association model to perform data compression. Firstly, computing device 101 acquires a first image (which also belongs to application-specific input data 103) as input for the data compression. Next, computing device 101 obtains an image feature codebook corresponding to the first image. For example, as described above, computing device 101 performs feature extraction on the first image and quantifies an extracted image feature vector by using an image feature quantization dictionary, to obtain the corresponding image feature codebook. Next, computing device 101 uses trained text-image association model 105 to obtain a text feature codebook associated with the corresponding image feature codebook, and obtains, based on the text feature codebook, text associated with the first image.

In some embodiments, in addition to acquiring the first image, computing device 101 may further acquire a second image (which also belongs to application-specific input data 103) as input for the data compression. Next, computing device 101 obtains an image feature codebook corresponding to the first image and the second image. That is, a feature codebook of an input image may be further extended based on the image feature codebook corresponding to the first image. Next, computing device 101 uses trained text-image association model 105 to obtain a more accurately described text feature codebook associated with the extended image feature codebook. Then, computing device 101 obtains, based on the more accurately described text feature codebook, text associated with the first image and the second image. In this way, correlations between queries (target data) and keys (reference data) are learned in a multi-level manner. Attributes of the queries are divided into several levels, allowing coarse-to-fine matching. The more detailed the attribute is described, the more accurate the matching data found or generated will be. More importantly, the multi-level structure allows model scaling and transformation. A larger data set can be easily accommodated by addition of more layers, or cross-domain knowledge can be learned by movement to other data sets.

In some embodiments, method 200 may further include the following steps to use the above trained text-image association model to perform data retrieval. Firstly, computing device 101 acquires first text (which also belongs to application-specific input data 103) as input for the data retrieval. Next, computing device 101 obtains a text feature codebook corresponding to the first text. For example, as described above, computing device 101 performs feature extraction on the first text, and quantifies an extracted text feature vector by using a text feature quantization dictionary, to obtain the corresponding text feature codebook. Next, computing device 101 uses trained text-image association model 105 to obtain an image feature codebook associated with the corresponding text feature codebook, and obtains, based on the image feature codebook, an image associated with the first text.

In some embodiments, in addition to acquiring the first text, computing device 101 may further acquire second text (which also belongs to application-specific input data 103)

as input for the data retrieval. Next, computing device 101 obtains a text feature codebook corresponding to the first text and the second text. That is, a feature codebook of input text may be further extended based on the text feature codebook corresponding to the first text. Next, computing device 101 uses trained text-image association model 105 to obtain a more accurately described image feature codebook associated with the extended text feature codebook. Then, computing device 101 obtains, based on the more accurately described image feature codebook, an image associated with the first text and the second text. In this way, advantages similar to the first text and the second text can be realized, that is, the coarse-to-fine matching can be learned in a multi-level manner, so as to achieve more accurate data matching.

It should be understood that, in addition to the second image and the second text, computing device 101 can further acquire other images and text to achieve feature codebook extension in the above manner, so that output data 104 associated with application-specific input data 103 can be obtained more accurately according to a further extended feature codebook.

Figure 3A:
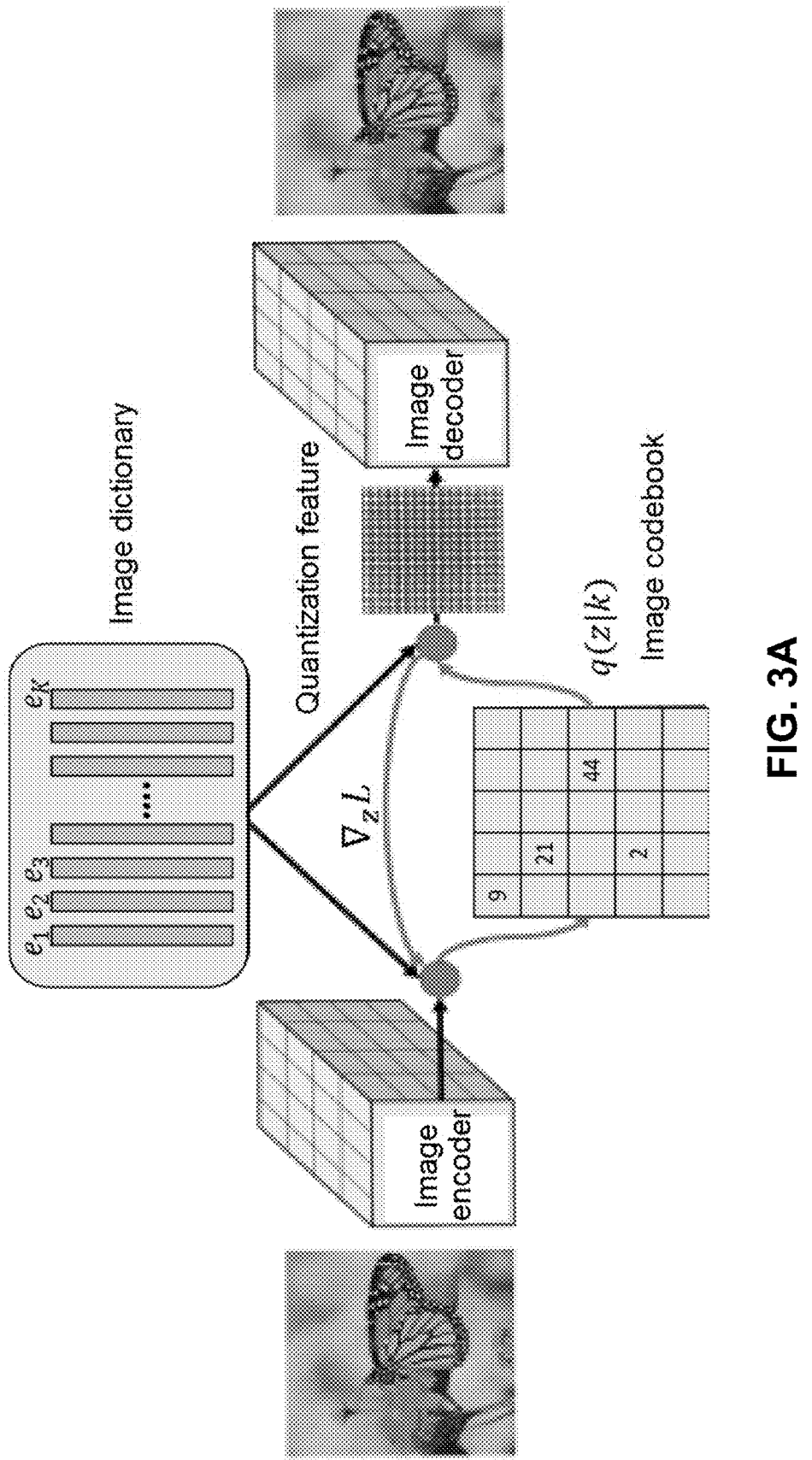
FIG. 3A and FIG. 3B are schematic diagrams of training a quantization model according to some embodiments of the present disclosure.

FIG. 3A is a schematic diagram of training an image quantization model according to some embodiments of the present disclosure. A process of learning an image feature quantization dictionary and an image feature codebook will be further described below with reference to FIG. 3A.

As shown in FIG. 3A, firstly, an image quantization model uses an image encoder to perform feature extraction on image input for training to obtain an image feature vector (deep latent feature $z_I$I) corresponding to the image input. Then, the image feature vector $z_I$I is quantified using an initialized dictionary $E \in \mathcal{R}^{K \times D}$, where K denotes the size of a discrete latent space, which may be used for representing K categories, for example, K feature vectors $e_1$, $e_2$, $e_3$, . . . , and $e_k$ in an image dictionary shown in FIG. 3A, and D denotes the dimension of each latent feature vector, which may represent the length of each dictionary entry, for example, the length of each feature vector in feature vectors $e_1$, $e_2$, $e_3$, . . . , and $e_k$. The quantization process may be represented by Equation (1) below:

$$q(z = k \mid I) = \begin{cases} 1 & k = \operatorname{argmin}_j \|z_E(I) - E_j\|_2 \\ 0 & \text{otherwise} \end{cases} \quad (1)$$

Here, I denotes image input, k denotes the value (for example, 9, 21, 44, or 2 in the image codebook shown in FIG. 3A) of image input I in latent space z, q(z=k|I) may denote an image-specific quantization result, $z_E$(I) may denote the $j^{th}$ image feature vector in the image feature vector obtained through the encoder, and $E_j$ denotes the quantization vector in the dictionary associated with the $j^{th}$ image feature vector. The image quantization model may use a lower limit function of evidence to look up the dictionary and realize the boundary constraint of log P(I). For example, when a residual between $z_E$(I) and $E_j$ satisfies a threshold condition $\operatorname{argmin}_j$, the function value is equal to 1, indicating that the quantization vector closest to the $j^{th}$ image feature vector can be found from the dictionary, so that the $j^{th}$ image feature vector can be associated with the entry of the corresponding quantization vector.

Figure 3B:
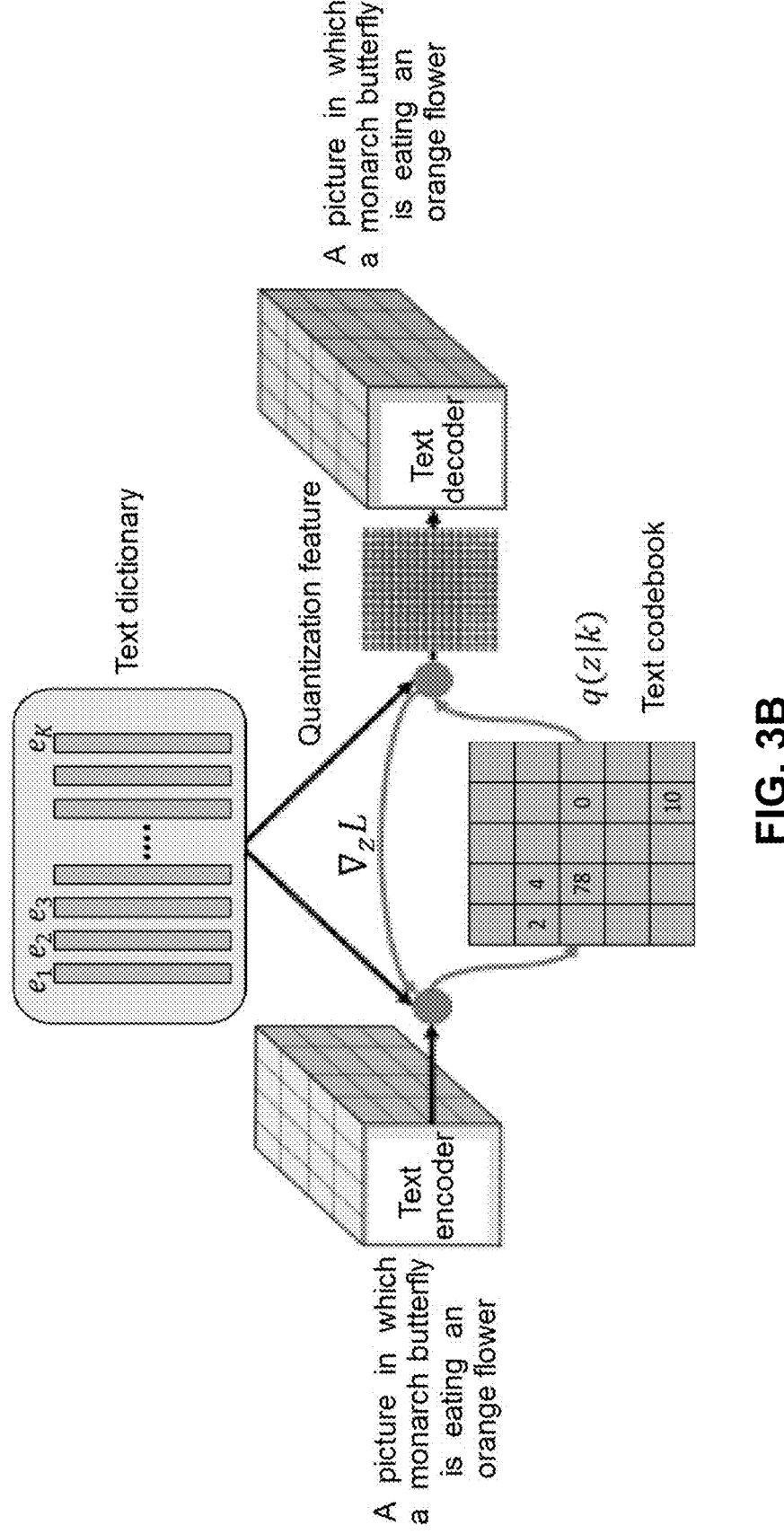

FIG. 3B is a schematic diagram of training a text quantization model according to some embodiments of the present disclosure. A process of learning a text feature quantization dictionary and a text feature codebook will be further described below with reference to FIG. 3B.

As shown in FIG. 3B, firstly, a text quantization model uses a text encoder to perform feature extraction on text input for training to obtain a text feature vector (deep latent feature $z_T$T) corresponding to the text input. Then, the text feature vector $z_T$T is quantified using an initialized dictionary similar to that shown in FIG. 3A, which is not described in detail again here. The quantization process may be represented by Equation (2) below:

$$q(z = k \mid T) = \begin{cases} 1 & k = \operatorname{argmin}_j \|z_E(T) - E_j\|_2 \\ 0 & \text{otherwise} \end{cases} \quad (2)$$

Here, T denotes text input, k denotes the value (for example, 2, 4, 78, 0, or 10 in the text codebook shown in FIG. 3B) of text input T in latent space z, q(z=k|T) may denote a text-specific quantization result, $z_E$(T) may denote the $j^{th}$ text feature vector in the text feature vector obtained through the encoder, and $E_j$ denotes the quantization vector in the dictionary associated with the $j^{th}$ text feature vector. The text quantization model may use a lower limit function of evidence to look up the dictionary and realize the boundary constraint of log P(T). For example, when a residual between $z_E$(T) and $E_j$ satisfies a threshold condition $\operatorname{argmin}_j$, the function value is equal to 1, indicating that the quantization vector closest to the $j^{th}$ text feature vector can be found from the dictionary, so that the $j^{th}$ text feature vector can be associated with the entry of the corresponding quantization vector.

The quantization models (including the image quantization model and the text quantization model) in this embodiment of the present disclosure may combine features $z_T$T and $z_I$I obtained through the encoder. The above Equations (1) and (2) may form the following Equation (3):

$$q(z = k \mid I, T) = \begin{cases} 1 & k = \operatorname{argmin}_j \|z_E(I, T) - E_j\|_2 \\ 0 & \text{otherwise} \end{cases} \quad (3)$$

Here, q(z=k|I, T) may denote a codebook used for recording indexes of dictionary entries corresponding to bidirectional (text-image, image-text) input. A KL divergence constant (equal to log K) is obtained by defining the a priori of z. In addition, a result obtained by combining $z_T$T and $z_I$I may also be expressed by Equation (4):

$$z_E(I, T) = E_k, \text{ where } k = \operatorname{argmin}_j \|z_E(I, T) - E_j\|^2 \quad (4)$$

In order to train the quantization model according to the present disclosure, the following loss function of Equation (5) may be used for training:

$$L = \|sg[z_E x - E]\|_2^2 + \beta \|z_E x - sg[E]\|_2^2 \quad (5)$$

Here, $\beta$ denotes a weighting parameter, sg denotes a stop gradient operator, the term $$\|sg[z_E x - E]\|_2^2$$

denotes optimization for the codebook, the term $$\beta \| z_E x - sg[E] \|_2^2$$

denotes optimization for the dictionary, the term $sg[z_E x]$ may be used for optimizing the decoder, but not the encoder (that is, $sg[z_E x=0]$), and the term $sg[E]$ may be used for optimizing the encoder, but not the decoder (that is, $sg[E]=$ 0).

Figure 3C:
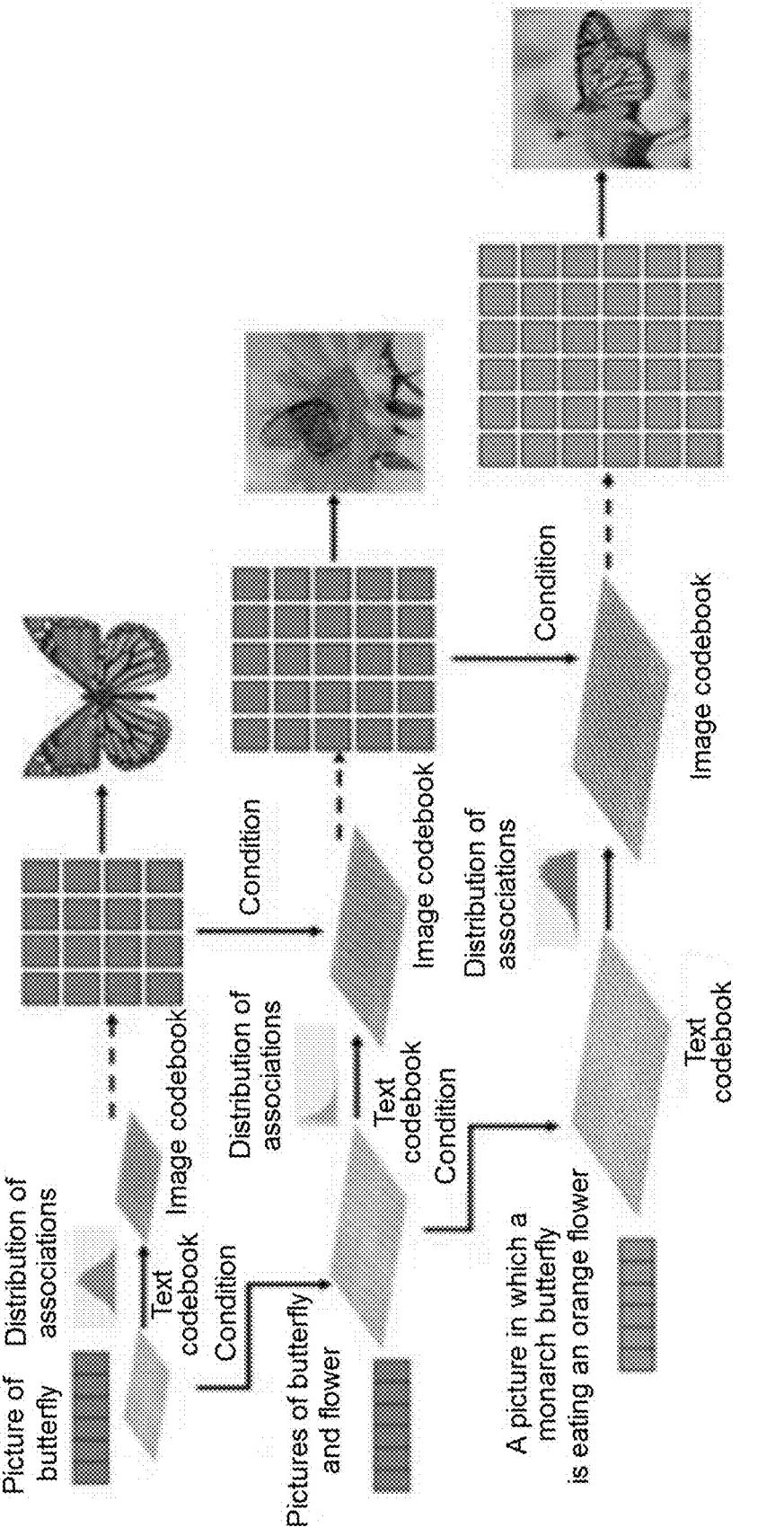
FIG. 3C and FIG. 3D are schematic diagrams of data processing according to some embodiments of the present disclosure.
Figure 3D:
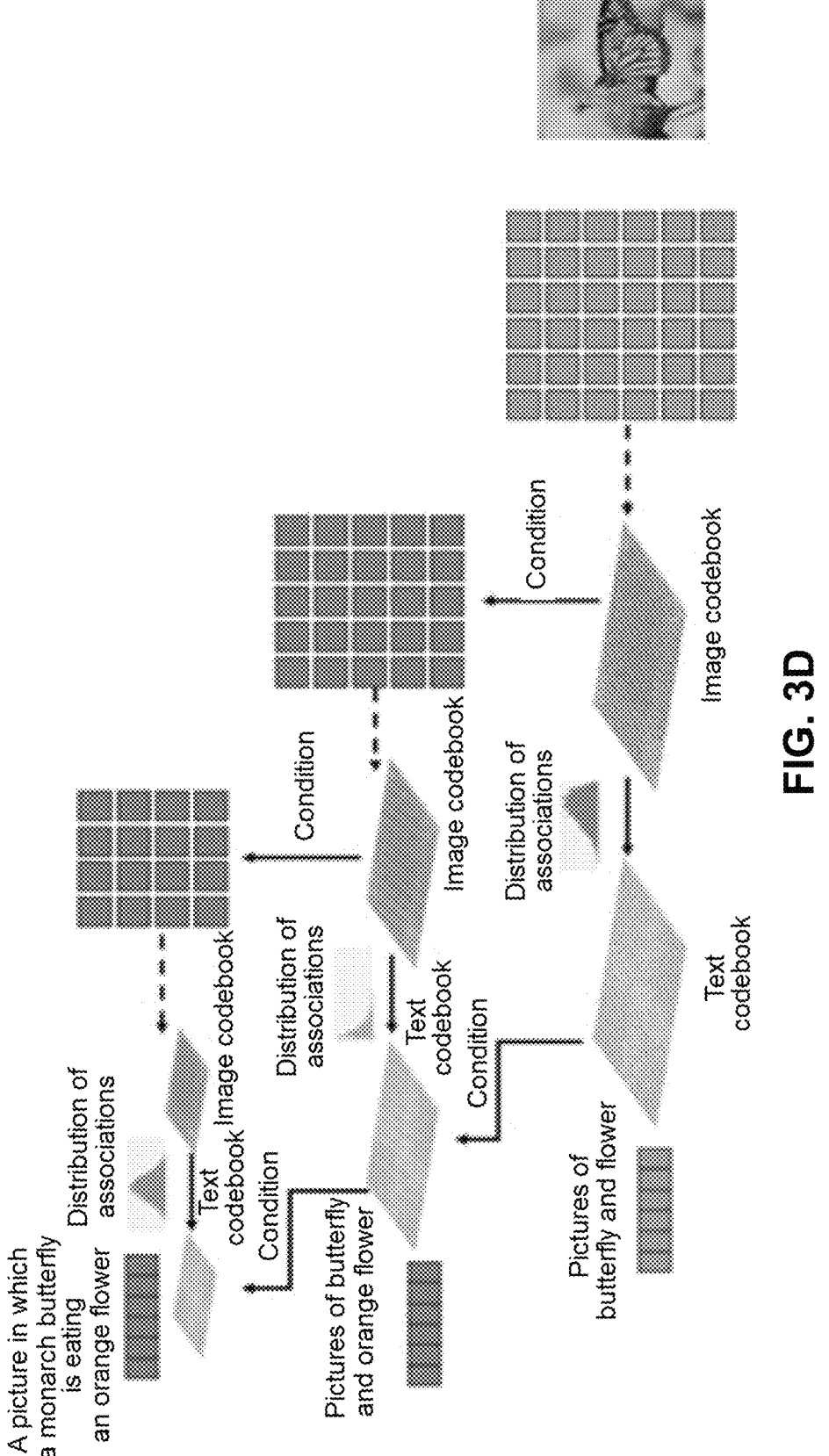

In the design of the present embodiment, an image (or video) may be represented as text. Forward conversion uses text (keywords) to retrieve a target image. Backward conversion compresses an image into text. The entire framework is a bidirectional structure, which may train the model end-to-end to achieve an optimal result. The entire framework includes the models in FIG. 3C and FIG. 3D. In FIG. 3C, it learns to map text to the target image, while in FIG. 3D, it is an inverse process. The two processes may be completed in a hierarchical manner (a three-level variational auto-encoder is taken as an example). Collinearity between text and an image is learned through the text-image association model. Each variational auto-encoder learns a quantization feature for dimensionality reduction. For image retrieval, the accuracy of image acquisition depends on the level of detail of the text description. For image compression, the disclosed framework extracts coarse-to-fine features at multiple levels and projects such features into text with different semantic descriptions.

Figure 4:
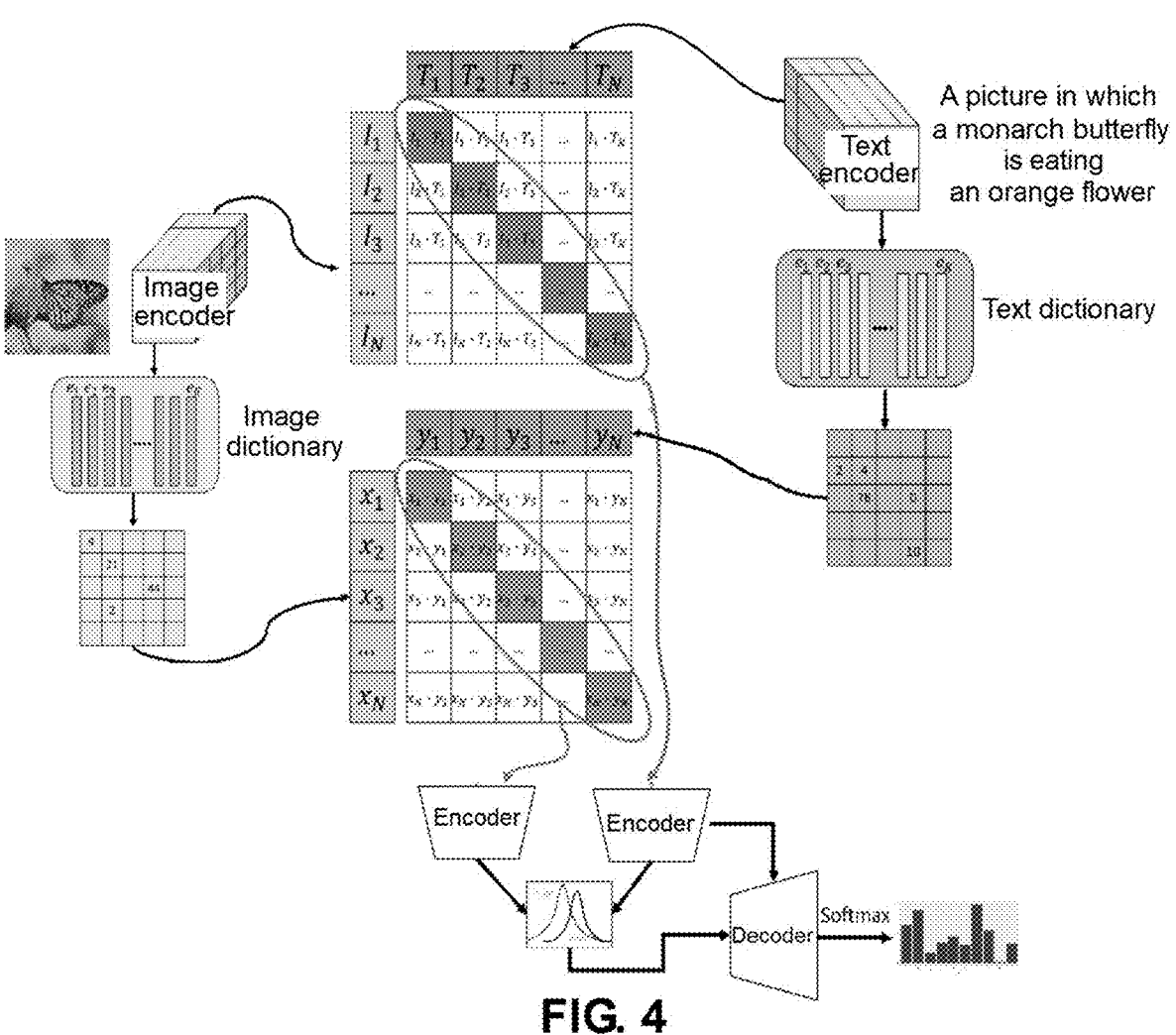
FIG. 4 is a schematic diagram of learning the distribution of associations according to some embodiments of the present disclosure.

FIG. 4 is a schematic diagram for training a text-image association model according to some embodiments of the present disclosure. A process of learning the distribution of associations between text and images (which may be considered as a similarity matching mechanism) will be further described below with reference to FIG. 4.

In an example, images may be used as queries for a data search, and text may be used as keys for a data search. In another example, images may be used as keys for a data search, and text may be used as queries for a data search. The basic structure of the text-image association model is to use continuous and discrete feature representations $z_E$ and $z_q$ to learn a global covariance matrix, where diagonal terms are confidence scores for paired data, and non-diagonal terms are scores for unpaired data. Different from the prior art, paired discrete features are further utilized for similarity estimation in the present disclosure. Continuous collinearity (as shown by diagonals in matrix I-T) and discrete collinearity (as shown by diagonals in matrix x-y) between the text and the images may be used for learning a robust distribution of associations. The process involves using quantization models to project their respective latent vectors into a latent Gaussian space. The discrete features are used as a condition for the distribution of associations to control a decoding process. Output of the decoder is normalized by a softmax function to produce a final result. Mathematically, calculation of a covariance matrix is shown in Equation (6) below:

$$\mathrm{Corr}_E = \sum_i^{2N} \frac{I_i \cdot T_i^T \cdot T_i \cdot I_i^T}{e^t} \qquad (6)$$

$$\mathrm{Corr}_q = \sum_i^{2N} \frac{x_i \cdot y_i^T \cdot y_i \cdot x_i^T}{e^t}$$

Here, t denotes a learned temperature control parameter, and $\mathrm{Corr}_E$ and $\mathrm{Corr}_q$ denote continuous and discrete covariance matrices.

A novel image retrieval and compression framework is provided in the present disclosure. The framework can find collinearity between text and images to achieve coarse-to-fine data matching. Three criteria may be used to measure the efficiency of the framework: compression ratio, reconstruction quality, and retrieval time. The method according to the present disclosure is a simple and efficient data compression and retrieval technology, which can significantly reduce data storage by learning data quantization, simplified dictionaries, and look-up tables.

Figure 5:
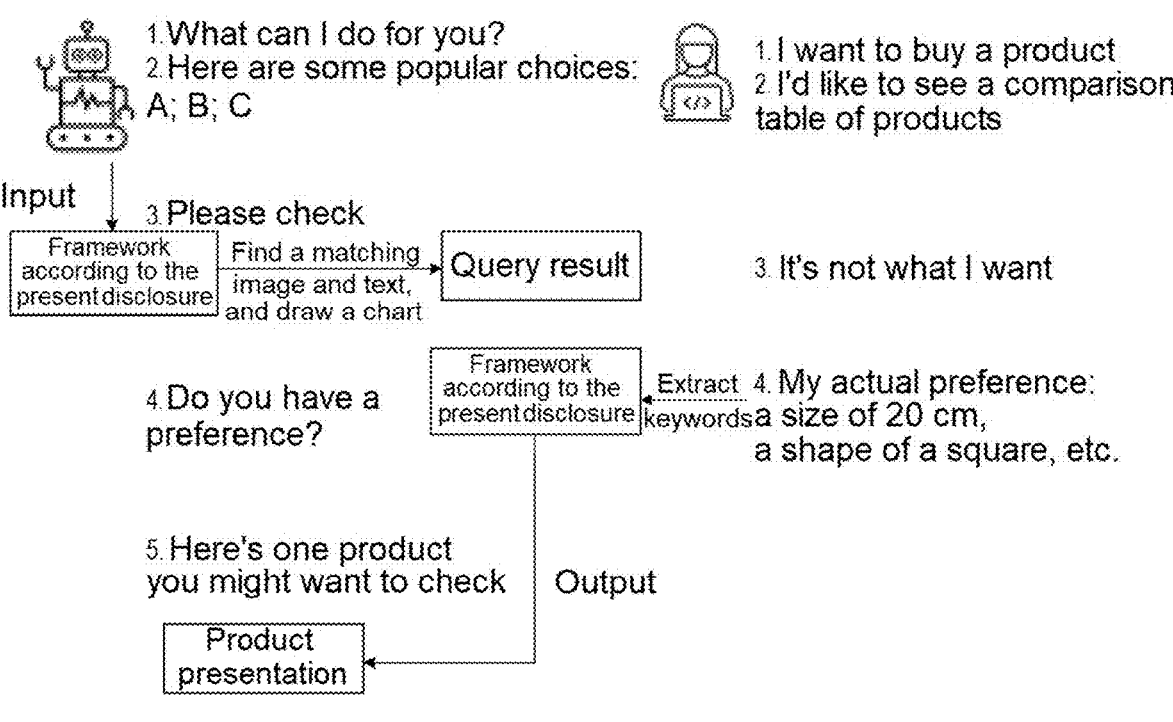
FIG. 5 shows a use case of a method according to some embodiments of the present disclosure.

A method using a customer service framework is shown in FIG. 5. In view of a user's unclear requirement, a robot is used to answer questions in imitation of a real salesperson. For example, when the user is not sure what to buy, the robot can use the model of the present disclosure to search for a specification of a currently popular product. According to a specific requirement of a customer, the robot can also search for a matching version of the product. More importantly, the robot can even learn correlations among different products. In another use case, when a user wants to share photos and videos with others, they can upload the data to a cloud service, using the framework of the present disclosure to compress and tag the data. In this way, others can use keywords to search for content they are interested in. More importantly, the framework of the present disclosure can be used to provide dedicated and unique dictionaries and look-up tables. This can not only avoid privacy leakage, but also provide exclusive services.

Figure 6:
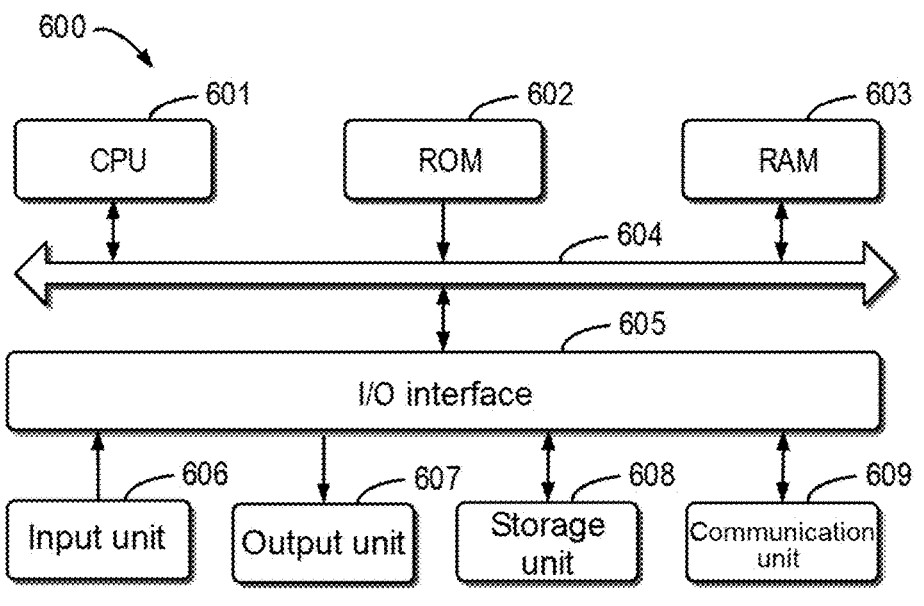
FIG. 6 is a block diagram of an example device that can be used for implementing embodiments of the present disclosure.

FIG. 6 is a schematic block diagram of example device 600 that may be used to implement embodiments of the present disclosure. Device 600 may be used for implementing method 200 of FIG. 2. As shown in FIG. 6, device 600 includes central processing unit (CPU) 601 that may perform various appropriate operations and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium such as storage unit 608. In some embodiments, part or all of the computer program may be loaded and/or installed onto device 600 via ROM 602 and/or communication unit 609. One or more operations of method 200 described above may be performed when the computer program is loaded into RAM 603 and executed by CPU 601.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/operations specified in one or a plurality of blocks in the flow charts and/or block diagrams. These computer-readable program instructions may also be stored in a computer-readable storage medium, and these instructions cause a computer, a programmable data processing apparatus, and/or a further device to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/operations specified in one or a plurality of blocks in the flow charts and/or block diagrams.

The flowcharts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on the involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method for data processing, comprising:
acquiring an image input and text input pair, the image input and text input pair comprising image input and text input;
obtaining an image feature codebook corresponding to the image input and a text feature codebook corresponding to the text input; and
training a text-image association model by using the image feature codebook and the text feature codebook, the text-image association model implementing the data processing based on the association between the image input and the text input;
wherein the text-image association model comprises a bidirectional auto-encoder arrangement configured to provide forward conversion of text to images over multiple hierarchical levels and backward conversion of images to text over multiple hierarchical levels.

2. The method according to claim 1, wherein the image feature codebook is obtained by training an image quantization model, the training an image quantization model comprising:
performing feature extraction on the image input to obtain an image feature vector corresponding to the image input;
quantifying the image feature vector by using an image feature quantization dictionary, to obtain the image feature codebook;
reconstructing image output corresponding to the image input by using the image feature codebook; and
training the image quantization model based on the image input and the image output.

3. The method according to claim 1, wherein the text feature codebook is obtained by training a text quantization model, the training a text quantization model comprising:
performing feature extraction on the text input to obtain a text feature vector corresponding to the text input;
quantifying the text feature vector by using a text feature quantization dictionary, to obtain the text feature codebook;
reconstructing text output corresponding to the text input by using the text feature codebook; and
training the text quantization model based on the text input and the text output.

4. The method according to claim 1, further comprising:
obtaining an image feature vector corresponding to the image input and a text feature vector corresponding to the text input; and
training the text-image association model by using the image feature vector and the text feature vector.

5. The method according to claim 1, further comprising:
acquiring a first image as input for the data processing;
obtaining a first image feature codebook corresponding to the first image;
obtaining, by using the trained text-image association model, a first text feature codebook associated with the first image feature codebook; and

obtaining text associated with the first image based on the first text feature codebook.

6. The method according to claim 5, further comprising:
acquiring a second image as input for the data processing;
obtaining a second image feature codebook corresponding to the first image and the second image;
obtaining a second text feature codebook associated with the second image feature codebook; and
obtaining text associated with the first image and the second image based on the second text feature codebook.

7. The method according to claim 1, further comprising:
acquiring first text as input for the data processing;
obtaining a first text feature codebook corresponding to the first text;
obtaining, by using the trained text-image association model, a first image feature codebook associated with the first text feature codebook; and
obtaining an image associated with the first text based on the first image feature codebook.

8. The method according to claim 7, further comprising:
acquiring second text as input for the data processing;
obtaining a second text feature codebook corresponding to the first text and the second text;
obtaining a second image feature codebook associated with the second text feature codebook; and
obtaining an image associated with the first text and the second text based on the second image feature codebook.

9. The method according to claim 1, wherein the data processing comprises at least one of data retrieval and data compression.

10. An electronic device, comprising:
at least one processor; and
at least one memory storing computer-executable instructions, wherein the computer-executable instructions when executed by the at least one processor, cause the electronic device to perform operations comprising:
acquiring an image input and text input pair, the image input and text input pair comprising image input and text input;
obtaining an image feature codebook corresponding to the image input and a text feature codebook corresponding to the text input; and
training a text-image association model by using the image feature codebook and the text feature codebook, the text-image association model implementing data processing based on the association between the image input and the text input;
wherein the text-image association model comprises a bidirectional auto-encoder arrangement configured to provide forward conversion of text to images over multiple hierarchical levels and backward conversion of images to text over multiple hierarchical levels.

11. The electronic device according to claim 10, wherein the image feature codebook is obtained by training an image quantization model, the training an image quantization model comprising:
performing feature extraction on the image input to obtain an image feature vector corresponding to the image input;
quantifying the image feature vector by using an image feature quantization dictionary, to obtain the image feature codebook;
reconstructing image output corresponding to the image input by using the image feature codebook; and training the image quantization model based on the image input and the image output.

12. The electronic device according to claim 10, wherein the text feature codebook is obtained by training a text quantization model, the training a text quantization model comprising:

performing feature extraction on the text input to obtain a text feature vector corresponding to the text input;

quantifying the text feature vector by using a text feature quantization dictionary, to obtain the text feature codebook;

reconstructing text output corresponding to the text input by using the text feature codebook; and training the text quantization model based on the text input and the text output.

13. The electronic device according to claim 10, wherein the operations further comprise:

obtaining an image feature vector corresponding to the image input and a text feature vector corresponding to the text input; and training the text-image association model by using the image feature vector and the text feature vector.

14. The electronic device according to claim 10, wherein the operations further comprise:

acquiring a first image as input for the data processing;

obtaining a first image feature codebook corresponding to the first image;

obtaining, by using the trained text-image association model, a first text feature codebook associated with the first image feature codebook; and obtaining text associated with the first image based on the first text feature codebook.

15. The electronic device according to claim 14, wherein the operations further comprise:

acquiring a second image as input for the data processing;

obtaining a second image feature codebook corresponding to the first image and the second image;

obtaining a second text feature codebook associated with the second image feature codebook; and obtaining text associated with the first image and the second image based on the second text feature codebook.

16. The electronic device according to claim 10, wherein the operations further comprise:

acquiring first text as input for the data processing;

obtaining a first text feature codebook corresponding to the first text;

obtaining, by using the trained text-image association model, a first image feature codebook associated with the first text feature codebook; and obtaining an image associated with the first text based on the first image feature codebook.

17. The electronic device according to claim 16, wherein the operations further comprise:

acquiring second text as input for the data processing;

obtaining a second text feature codebook corresponding to the first text and the second text;

obtaining a second image feature codebook associated with the second text feature codebook; and obtaining an image associated with the first text and the second text based on the second image feature codebook.

18. The electronic device according to claim 10, wherein the data processing comprises at least one of data retrieval and data compression.

19. A computer program product comprising a non-transitory computer-readable medium having computer-executable instructions stored therein, wherein the computer-executable instructions, when executed by an electronic device, cause the electronic device to perform operations comprising:

acquiring an image input and text input pair, the image input and text input pair comprising image input and text input;

obtaining an image feature codebook corresponding to the image input and a text feature codebook corresponding to the text input; and training a text-image association model by using the image feature codebook and the text feature codebook, the text-image association model implementing data processing based on the association between the image input and the text input;

wherein the text-image association model comprises a bidirectional auto-encoder arrangement configured to provide forward conversion of text to images over multiple hierarchical levels and backward conversion of images to text over multiple hierarchical levels.

20. The computer program product according to claim 19, wherein the image feature codebook is obtained by training an image quantization model, the training an image quantization model comprising:

performing feature extraction on the image input to obtain an image feature vector corresponding to the image input;

quantifying the image feature vector by using an image feature quantization dictionary, to obtain the image feature codebook;

reconstructing image output corresponding to the image input by using the image feature codebook; and training the image quantization model based on the image input and the image output.

* * * * *